United States Patent [19]
Russell et al.

[11] Patent Number: 5,166,694
[45] Date of Patent: Nov. 24, 1992

[54] VEHICLE LOCATION SYSTEM HAVING ENHANCED POSITION LOCATION PROCESSING

[75] Inventors: Gary S. Russell, Fullerton; J. Brooks Chadwick, Anaheim; Jacob L. Bricker, Santa Ana, all of Calif.

[73] Assignee: Hughes Aircraft Company, Los Angeles, Calif.

[21] Appl. No.: 747,312

[22] Filed: Aug. 20, 1991

[51] Int. Cl.$^5$ .............................. G01S 3/02
[52] U.S. Cl. ................... 342/457; 342/465; 342/387
[58] Field of Search .............. 342/465, 457, 387

[56] References Cited

U.S. PATENT DOCUMENTS

| 4,839,656 | 6/1989 | O'Neill et al. | 342/357 |
| 4,876,550 | 10/1989 | Kelly | 342/451 |
| 5,045,860 | 9/1991 | Hodson | 342/465 |

*Primary Examiner*—Theodore M. Blum
*Attorney, Agent, or Firm*—Wanda K. Denson-Low

[57] ABSTRACT

Position location processing using a series of processing routines for enhanced position location in a hyperbolic ranging system adapted to more accurately indicate the position of mobile transmitters within the system. These routines incorporate data in an overdetermined system to refine the position estimate and speed up computation time. The processing utilizes all data received and filters out data caused by radio propagation measurement error that contributes to overall position error. It selects the optimum subset of data to process prior to performing time-intensive mathematical operations which results in a substantial reduction in computation time, allowing for many more overall position computations per second. The advantages of the present position location processing include its ability to incorporate all data received to reduce the overall position error. Processing filters that provide for data extraction and position verification enhance the accuracy and reliability of the position estimate. Because the filtering also extracts the optimum data for processing, the present processing permits location and identification of hundreds of transmitters and maintains the status of each.

12 Claims, 4 Drawing Sheets

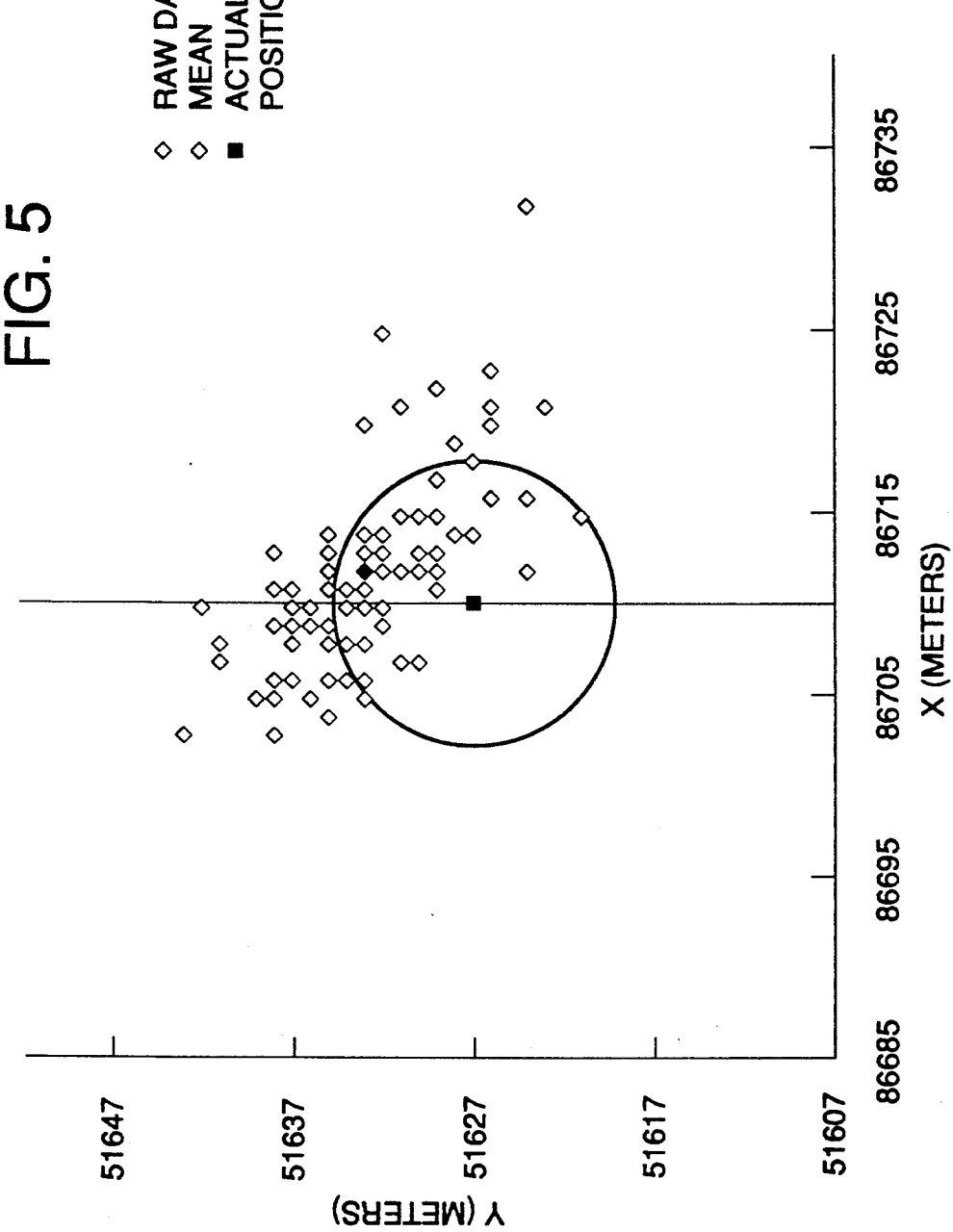

VEHICLE LOCATION SYSTEM HAVING ENHANCED POSITION LOCATION PROCESSING

BACKGROUND

The present invention generally relates to position location systems, and more particularly, to a vehicle position location system employing enhanced position location processing.

To efficiently manage its resources, a host community needs to have accurate and timely knowledge of the location of its vehicles and personnel. Such vehicles include emergency units (police and fire), trucks, buses, disabled or stolen automobiles, locomotives, box cars, coastal vessels, etc. This data may be combined with current assignment information and displayed for the benefit of supervisory personnel at a single or multiple central locations. Today's existing navigational aids are not well suited to this application because the location is calculated and displayed in the vehicle rather than at the central control point. A separate communications link then has to be provided to relay the positions back to the central facility. In environments consisting of large numbers of vehicles, the time to obtain reliable position fixes on all units of interest is typically excessive.

Previous location systems have been developed which are described in U.S. Pat. Nos. 4,740,792, and 3,714,573, for example, which disclose satellite-based and land-based systems, respectively. Such previous systems employ a basic set of equations to calculate a transmitter's location using the minimum required data with no additional processing. This minimum processing often results in severe error in the computed position. In addition, systems that attempt to use all received data with no preprocessing generally take excessive time to compute a single position. These systems become heavily backlogged when attempting to locate large numbers of transmitters.

Therefore, there is a need for an improved vehicle location system having enhanced vehicle location processing that circumvents the problems of prior systems.

SUMMARY OF THE INVENTION

The present invention provides for a processing method for use in a position location system that may be land or satellite based, and is employed to more accurately indicate the position of vehicles transmitting within the system. The position location processing method of the present invention is comprised of a series of processing routines for position location in a hyperbolic ranging system. These routines incorporate data in an overdetermined system to refine the position estimate and speed the time of computation. The position location processing method of the present invention utilizes all data received and filters out data caused by radio propagation measurement error that contribute to the overall position error. In addition, the present method selects the optimum subset of data to process prior to performing time-intensive mathematical operations, which results in a substantial reduction in computation time, thus allowing for many more overall position computations per second.

The advantages of the present position location processing method include its ability to incorporate all data received to reduce the overall position error. Previous systems employ a basic set of equations to calculate a transmitter's location using the minimum required data with no additional processing. This minimum processing often results in severe error in the computed position. In addition, systems that attempt to use all received data with no preprocessing generally take excessive time to compute a single position. These systems become heavily backlogged when attempting to locate large numbers of transmitters. To minimize these problems, filters for data extraction and position verification are provided in the present invention to enhance the accuracy and reliability of the position estimate. Because the filtering also extracts the optimum data for processing, the present position location processing method is expedited and provides location and identification for hundreds of transmitting units within a single operating network.

The present processing method has been incorporated in a vehicle location system that may be used in a number of applications including fleet management for law enforcement, service and government agency vehicles, and emergency notification and stolen vehicle recovery services for commercial motorists. Additionally, the present processing method may be applied to tactical environments for tracking nonessential personnel and equipment in conjunction with an enhanced position location reporting system known as the EPLRS system. Also the present processing method may be employed in traffic management systems for ground, ship and airborne systems.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which:

FIG. 5 shows test data comprising a scatter plot derived from live data and using the position location processing method of FIG. 2.

DETAILED DESCRIPTION

Figure 1:
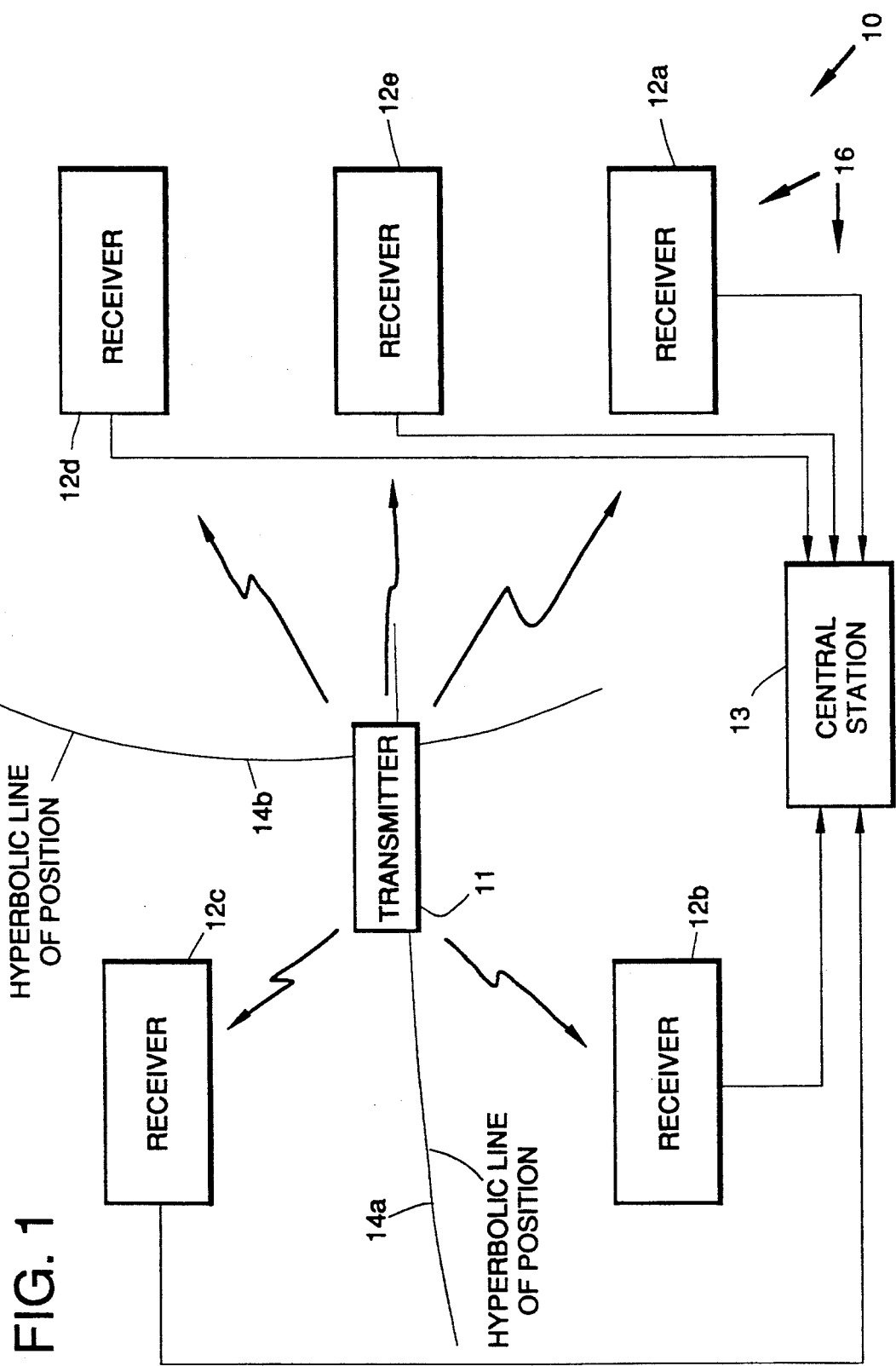
FIG. 1 shows a vehicle location system incorporating hyperbolic ranging in which the present invention is employed.

By way of introduction, and with reference to FIG. 1, the position location processing method 20 of the present invention (illustrated and described with reference to FIG. 2 below) is employed in a system 10 that incorporates hyperbolic ranging to determine the relative position of a mobile transmitter 11. The position is determined by collecting time-of-arrival data from pairs of receivers 12. The position location processing method 20 combines differential times-of-arrival of the signal transmitted by the transmitter 11 to resolve its position. Time-of-arrival signals from four receivers 12 are necessary for three-dimensional location whereas two-dimensional positions are computed using three time-of-arrival signals. The position of the transmitter 11 is found at the intersection of hyperbolas 14, two of which (hyperbolas 14a, 14b) are shown in FIG. 1.

The vehicle location system 10 in which the present method 20 is employed has been designed to provide efficient, timely and accurate position location information regarding all vehicles (transmitters 11) in the system 10. Each vehicle is equipped with the transmitter 11 that transmits a spread spectrum signal to the receivers 12 deployed in a coverage area. The receivers 12 measure the time of arrival values of the transmitted signal from the transmitter 11 and relay this data to a central control station 13 that computes and displays the position on a map display. The vehicle position data is combined with other pertinent status data of the system 10 and is concurrently displayed.

The vehicle location system 10 is based on a well-developed position location and reporting system (PLRS) developed by the assignee of the present invention, that has been designed to accurately locate randomly placed transmitters 11 and to handle messages to and from those transmitters 11. The time-of-arrival measurement and networking technology in the PLRS system has been adapted for use in the vehicle location system 10 to provide fast response times and typical transmitter position accuracies of 30 meters.

The receivers 12 and the central control station 13 from a synchronous network 16 wherein a sufficient number of receivers 12 are deployed to achieve the desired coverage area. The number of such receivers 12 are determined by the propagation characteristics of the particular coverage area. The transmitter 11 transmits asynchronously requiring no synchronization with the rest of the network 16. The position of the transmitter 11 is determined and displayed almost instantaneously from the time of the transmission.

The update rate of the transmitter 11 is programmable from once a second to once per several minutes. Vehicles are displayed symbolically on a map display that employs a digital color map of the area. Streets, street names, vehicles and special landmarks, along with messages are also color coded for easy identification. The map display includes map movement and zoom, label control, distance measurement, and may be tailored to show special symbols for critical events such as emergencies. A complete database is maintained on all vehicles, receivers 12 and central control points that is easily accessed, displayed, and updated.

The vehicle transmitters 11 contain a simple spread spectrum transmitter, and a compatible spread spectrum correlator is required at each receiver 12. Therefore, once the system 10 is in place, additional transmitters 11 may be added with ease. Operation of the system 10 requires each vehicle transmitter 11 to be within electrical line of sight of at least three receivers 12. This is accomplished by locating many receivers 12 on prominent hills or towers in the coverage area.

Position location from asynchronous transmitters 11 is achieved using differential time of arrival (DTOA) ranging. The transmitter 11 transmits a spread spectrum signal that employs noise-like properties mixed with the vehicle's identification. Each receiver 12 that receives the signal measures the time of arrival of the signal using its spread spectrum receiver. Since all receivers 12 and central control stations 13 are synchronized, an accurate time reference is known throughout the network 16. Time-of-arrival data messages are then relayed to the central control station 13 where they are combined and processed. The position of the transmitter 11 is found by examining the differences in the times-of-arrival of simultaneous measurements and computing the intersection of the resulting hyperbolic lines of position 14a, 14b as is shown in FIG. 1. Data from three receivers 12 is used to compute a two-dimensional position (T(x,y)) of the transmitter 11. Additional receivers 12 provide propagation redundancy which allows the location processing method 20 to process additional position estimates and filter out errors caused by timing or multipath. The vehicle transmitter 11 is located at the intersection of the hyperbolas 14 shown in FIG. 1.

The vehicle location system 10 uses a 3 MHZ spread spectrum signal to achieve time-of-arrival measurement precision of 12.5 nanoseconds by implementing timing adjustments in the receivers 12. Thus, position accuracy on the order of several meters is theoretically possible. In practice, timing errors, multipath and position offsets resulting from geometry considerations limit accuracies on the order of 30 meters circular error probable (CEP). Operation in heavily cluttered urban areas can degrade this further. However the present method 20 provides filters to reduce the effects of urban signal distortion, and minimize these problems, as will be discussed below.

A practical implementation of hyperbolic positioning solves the following set of circular quadratic equations:

$$(x-x_0)^2+(y-y_0)^2=D_0^2$$

$$(x-x_1)^2+(y-y_1)^2=D_1^2=(d_1+D_0)^2$$

$$(x-x_2)^2+(y-y_2)^2=D_2^2=(d_2+D_0)^2$$

where:
$T=(x,y)$ is the position of the transmitter 11;
$P_i=(x_i, y_i)$ is the position of ith relay, $i=0,1,2$;
$D_0$ is the distance from the transmitter 11 to $P_0$ (unknown);
$D_i$ is the distance from the transmitter 11 to $P_i$, $i=1,2$;
$d_i=D_i-D_0=c(t_i-t_0)$, $i=1,2$;
$t_i$ is the time of arrival of transmitted pulse to $P_i$; and
c is the speed of light.

The $(t_i-t_0)$ values are the differential times-of-arrival values computed from the data. The position location processing method 20 solves the above quadratic equations using standard linear algebra techniques to determine the position of the transmitter 11.

Given one set of data consisting of the times-of-arrival values of a transmitted signal received at three receivers 12a, 12b, 12c, the quadratic equations above can provide zero, one or two solutions for x and y (the transmitter position), depending upon the relative geometries of the transmitter 11 and reporting receivers 12a, 12b, 12c. Additional processing is therefore needed to accurately resolve the position. This is derived from the time-of-arrival data from remaining receivers 12d, 12e that have also measured the transmitted signal. The present position location processing method 20 examines data received from all receivers 12 and selects the optimum subset of data for further processing in the quadratic equations above. This will be discussed in detail below.

Figure 2:
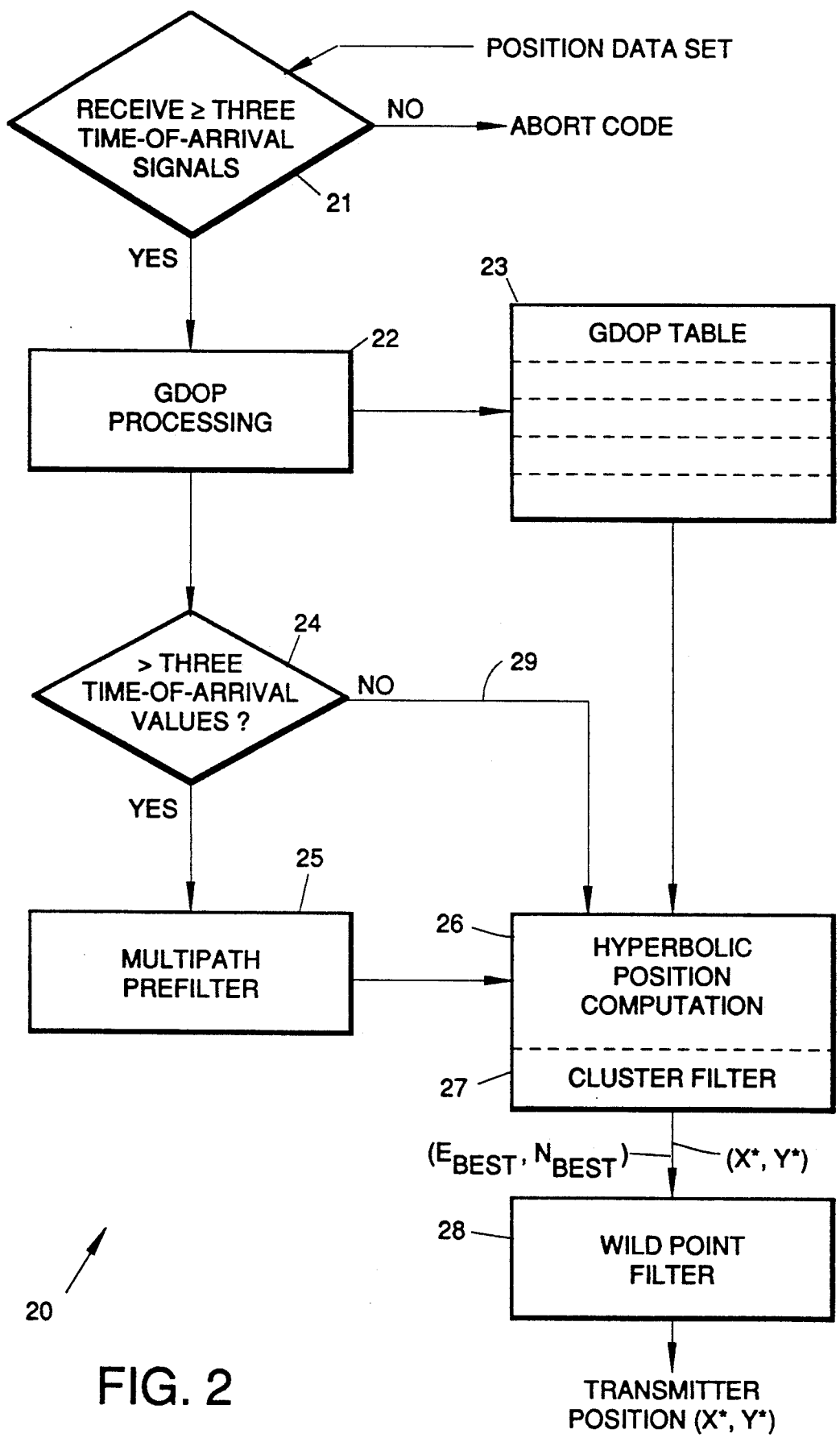
FIG. 2 shows a process flow of a position location processing method in accordance with the principles of the present invention.

The process flow of the position location processing method 20 is generally shown in FIG. 2. A minimum of three time-of-arrival values are required for the position of the transmitter 11 to be computed. The method 20 begins by inheriting a position data set (PDS) comprised of all time-of-arrival values received for a particular transmitter 11 during a given transmission. The position data set is comprised of the following information: (1) a vehicle (transmitter 11) ID, (1) a number indicating the number of times of arrival that are included in the set, and (1) for each reporting receiver: a receiver ID and a time of arrival value. The position data set orders the receiver ID/time of arrival pairs in ascending manner with the receiver ID corresponding to the minimum time of arrival appearing first. Differential times of arrival are formed by subtracting the minimum time of arrival from all subsequent times of arrival. If less than three time-of-arrival values are received in the position data set, the position computation routine is aborted and an identifying code is provided. When at least three time-of-arrival values reside in the position data set (block 21), they are processed by the processing blocks shown in FIG. 2.

The first processing stage is to select the optimum subset of data for further processing. This involves examining the position data set and extracting the time-of-arrival data associated with those receivers 12 that exhibit the best geometrical relation to the transmitter 11. This is accomplished by constructing a geometric dilution of precision (GDOP) table 23 at periodic intervals. Geometric dilution of precision is discussed in more detail below. However, the GDOP table is built in accordance with the following algorithm.

(1) At T second intervals do:
  (a) For each active vehicle, do:
    (i) Determine last known position
    (ii) Compute GDOP value for each receiver triplet
    (iii) Order receiver ID's as a triplet in ascending order from lowest to highest GDOP value
    repeat for (b), (c), . . . end;
  repeat for (2), (3), . . . end.

This GDOP table is then referenced when computing positions from multiple time-of-arrival data sets of the receivers 12. If there are greater than three time-of-arrival signals, the next stage in the position location processing method 20 comprises a first filter 25 (or prefilter 25) that prefilters the time-of-arrival data to remove any data that may have been corrupted by anomalies in the propagation of the transmitted signal, such as are caused by multipath. More specifically, the following processing algorithm is employed.

(1) If there are greater than three triplets, do:
  (a) Read first triplet entry from the GDOP table,
  (b) Check if all receiver ID's comprising the triplet are in the position data set,
  (c) If yes, compute the position using the triplet, if no, read next triplet from the GDOP table and repeat step (b),
  (d) stop after predetermined (5, for example) triplets.

If there are three or less time-of-arrival signals, the prefiltering 25 is bypassed, as is indicated by bypass path 29. From this resulting data set, a position is computed using the above quadratic equations, and including a clustering process 27 that will be described in detail below. Finally, a second filter comprising a wild point filter 28 is provided to eliminate any computed position locations that are physically inconsistent with the last known positions, as will be described in detail below.

The position computation processing 26 is sensitive to relative geometries of the transmitter 11 and the receivers 12. The geometric dilution of precision (GDOP) is a measure of how measurement errors affect the overall position error as a result of these geometries. Because the position location processing 26 seeks to take advantage of multiple receiver triplets in its estimate of position of the transmitter 11, the position location processing 26 utilizes those triplets having the lowest GDOP values. At periodic intervals during position location processing 26 (specified by a system parameter modifiable by the operator), the processing 26 recomputes all the geometric dilution of precision values based on the current position of the transmitter 11. These are stored in a list and consulted when the next position is to be computed. Receivers 12 with lower GDOP values are used first in computing the position of the transmitter 11. The arithmetic average GDOP value is computed and stored along with the position of the transmitter 11 upon the occurrence of each successful computation. These values are also used in determining a confidence value associated with each position and in assessing zones of good and poor geometry in the coverage area.

Because the expressions comprising the above-cited equations are quadratic, two solutions may result that are mathematically valid. In most cases (determined by the geometry of the vehicle and receiver 12 locations), the physically valid solution is easily identified. In other cases, however, additional information is needed to resolve the ambiguity. The additional information comes in the form of time-of-arrival signals received from other receivers 12. By using additional pairs of time-of-arrival values, the present processing method 20 computes several candidate positions and statistically combine them through the clustering process 27 to narrow the ambiguities. However, since this computation is combinatorial, the amount of processing required climbs rapidly.

Figure 3:
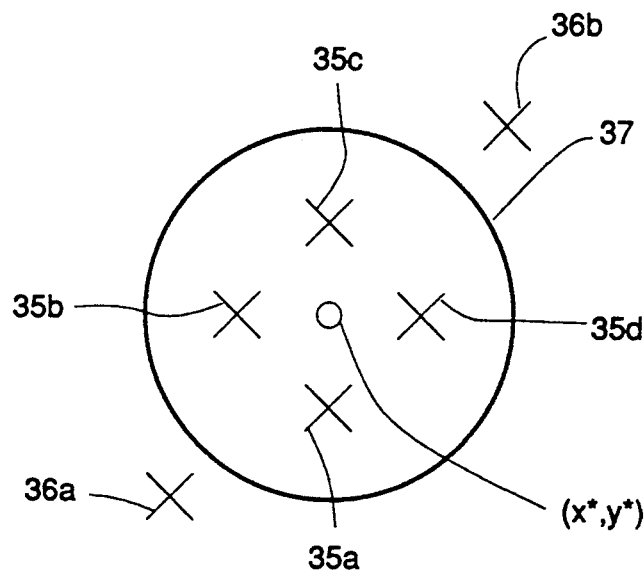
FIG. 3 shows a clustering process employed in the processing method of FIG. 2.

FIG. 3 shows the concept of the position resolution and clustering process 27 in accordance with the principles of the present invention. The clustering process 27 is realized by forming a statistical average of all single solution positions 35a–35d and then combining remaining (double root) positions 36a, 36b based on minimum distances to mean position 37. The mean position 37 is updated as each double root is processed.

More specifically, the clustering process 27 is accomplished using the following processing algorithm.

Denote the total number of solution pairs $(E_i, N_i)$ computed from each triplet as M.

(a) If $M \geq 2$, then compute the sample mean and sample variance of the $E_i$ and $N_i$ as follows:

$$<E> = \frac{1}{M} \sum_{i=1}^{M} E_i$$

$$<N> = \frac{1}{M} \sum_{i=1}^{M} N_i$$

$$(S_E)^2 = \frac{1}{M-1} \sum_{i=1}^{M} [E_i - <E>]^2$$

$$(S_N)^2 = \frac{1}{M-1} \sum_{i=1}^{M} [N_i - <N>]^2$$

(b) If $M=1$, set the best estimates of the transmitters north and east position coordinates as: $E_{BEST}=E_i$, and $N_{BEST}=N_i$, and cease processing this set of time of arrival values.

(c) If $M=0$, cease processing this set of time of arrival values (indicate "no solution").

Form the best estimates of the transmitter's north and east position coordinates from the $(E_i, N_i)$ as follows:

$$x^* = E_{BEST} = \frac{1}{K} \sum_{i=1}^{K} \delta_i E_i$$

$$y^* = N_{BEST} = \frac{1}{K} \sum_{i=1}^{K} \delta_i N_i$$

where $\delta_i = 1$ when $[E_i - <E>]^2 \leq S_E^2 + 1$ and $[N_i - <N>]^2 \leq S_N^2 + 1$ $\delta_i = 0$, otherwise, $$\delta_i = \sum_{i=1}^{M} \delta_i.$$

Additional location errors occur as a result of signals transmitted from a vehicle transmitter 11 that arrive at the receivers 12 by way of a bounce path (multipath). The errors are directly proportional to the extra distance these signals travel from the vehicle transmitter 11 to the receivers 12. This has the effect of "elongating" the time-of-arrival distribution and can produce rather complicated position errors, depending upon the relative geometry of the transmitter 11 and receivers 12. To reduce the effect that these multipath signals have on the position of the transmitter 11, the prefilter 25 is employed to detect (not correct) the arrival of a time-of-arrival value corrupted by multipath. It is designated as a prefilter 25 because the time-of-arrival values are examined and filtered before the computation of the position of the transmitter 11.

Figure 4A:
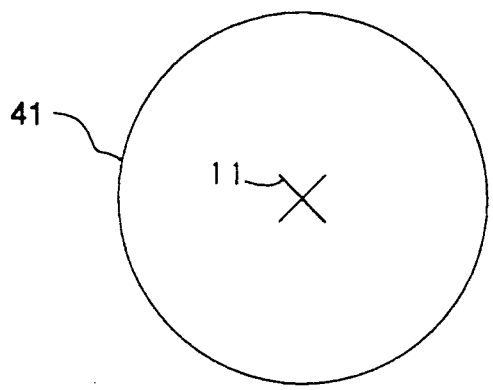
FIG. 4a illustrates a prefiltering process employed in the processing method of FIG. 2.

The prefiltering is accomplished by creating a "multipath feasibility circle 41" around the last set of valid time-of-arrival values for that transmitter 11 as is shown in FIG. 4a. The size of that multipath feasibility circle 41 is determined by a system parameter that is an estimated maximum speed of the vehicle containing the transmitter 11. Each time the position of the transmitter 11 is computed, a set of expected or actual time-of-arrival values is computed and stored. When the next set of time-of-arrival values arrive for that vehicle's transmitter 11, they are compared one by one (for each receiver 12) against the last actual set. A time-of-arrival value is considered to be a multipath signal if:

$$|DTOA_k(\text{expected}) - DToA_k| > Z_{th} t_k + Z_n$$

where $DTOA_k(\text{expected})$ is the computed (expected) differential time of arrival for the kth receiver 12 (counts); $DTOA_k$ is the actual received differential time of arrival for the kth receiver 12 (counts); $Z_{th}$ is the maximum movement threshold (counts/sec); $t_k$ is the elapsed reporting time from the last update for the kth receiver 12 (sec); and $Z_n$ is the noise floor of the system 10.

Since prefilter processing 25 is based on differential time-of-arrival values, accounting is based on the minimum received time-of-arrival value in a particular set. When a multipath time-of-arrival value is found, it is removed from the position data set. This processing is then repeated for all time-of-arrival values in the position data set until all have been tested or until only three time-of-arrival values remain. If only three time-of-arrival values appear in the data set (as is often the case), the prefilter 25 is bypassed, as is indicated by the path 29.

The above-described time-of-arrival prefiltering process 25 is used for testing all time-of-arrival values other than the minimum values. However, if the minimum time-of-arrival value is itself a multipath signal, then all subsequent time-of-arrival values are identified as such. Therefore, as a precursor to the above prefiltering process 25, a similar test strategy is employed to ensure that the minimum time-of-arrival value received is indeed valid. This process checks all received differential times-of-arrival values against the actual values, and if all values meet the condition of the last cited equation, then the minimum is suspected as multipath, is removed, and is replaced by the next time-of-arrival value in the position data set as the minimum.

Figure 4B:
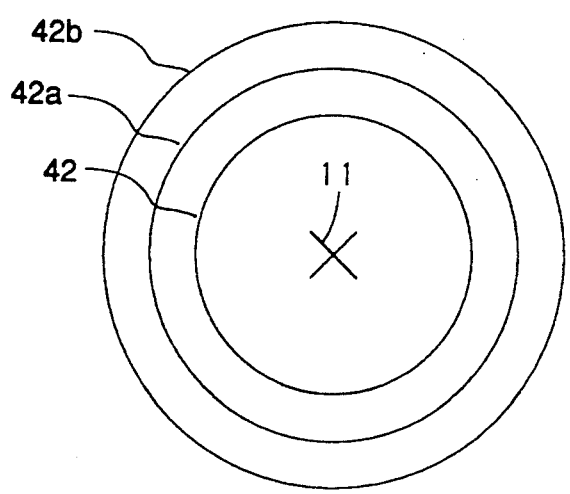
FIG. 4b illustrates a wild point filtering process employed in the processing method of FIG. 2.

Although multipath filtering 25 and the clustering process 27 are used in combining multiple positions formed from individual triplets, it is still possible for the resulting mean position value T(x,y) to be in error. This usually results from unfiltered multipath signals or position data sets containing only three time-of-arrival values. A final check is therefore included in the present processing method 20 to identify "non-realizable" computed positions, identified herein as wild point filtering 28. As in the case of the multipath prefilter 25, and with reference to FIG. 4b, a wild point feasibility circle 42 is constructed around the last known position of high confidence for that vehicle transmitter 11 and is allowed to grow (indicated by circles 42a, 42b) as the elapsed time from the last update increases based on the vehicle's mean or expected speed. However, the comparison is done against the vehicle's position of the transmitter 11 rather than the time-of-arrival value of signals transmitted thereby. Any point that falls outside the wild point feasibility circle 42 is tagged as a wild (potentially erroneous) point with an appropriate identifying code.

FIG. 5 shows an enlarged scatter plot using live data derived from the position location processing method 20 of the present invention. The processing method 20 was successfully tested and implemented as part of the vehicle location system 10 in a demonstration system. Position accuracies have been verified at 30 meters circular error probable (CEP) with error values on the order of 15 meters achievable in suburban environments. The multipath prefilter 25 and wild point filter 27 have successfully reduced wild points that has been verified using identification codes both in real-time tests and examination of previously derived transmission data files. Furthermore, the computation times for computing transmitter position have been reduced when compared to computations performed without the present method 20.

The present position location processing method 20 provides for vehicle location in a number of applications including fleet management for law enforcement, service and government agency vehicles, and emergency notification and stolen vehicle recovery services for commercial motorists. Additionally, the present processing method 20 has application in tactical environments for tracking nonessential personnel and equipment as in conjunction with the enhanced position location reporting system (EPLRS) developed by the assignee of the present invention. The present processing method 20 may also be used in traffic management systems for ground, ship and airborne systems.

Thus there has been described a new and improved vehicle position location system having enhanced position location processing. It is to be understood that the above-described embodiment is merely illustrative of one of the many specific embodiments which represent applications of the principles of the present invention. Clearly, numerous and other processes can be readily devised by those skilled in the art without departing from the scope of the invention.

What is claimed is:

1. A method for use in a vehicle location system employing hyperbolic ranging, the vehicle location system comprising a mobile transmitter and at least three time-synchronized receivers, and wherein the transmitter is adapted to transmit a vehicle location signal that is received by the receivers and wherein the receivers are each adapted to transmit time of arrival signals to a central processing station for processing, said method comprising the steps of:

receiving at least three time of arrival signals from the receivers which comprises a position data set of all time-of-arrival values received for the transmitter during a given transmission;

processing the at least three time of arrival signals to produce a geometric dilution of precision (GDOP) table at periodic intervals whose values are representative of the geometrical relation between the receivers and the transmitter;

if at least three time of arrival signals are received, prefiltering the at least three time of arrival signals using a prefilter to remove any signals that are corrupted by anomalies in the propagation of the transmitted signal, thereby determining an optimum subset of data for further processing; and computing the relative position of the transmitter by solving a predetermined set of quadratic equations using the differential times-of-arrival values of the time of arrival signals received by the receivers to provide a computed position signal.

2. The method of claim 1 which further comprises the step of:

cluster filtering the computed position signal using a clustering process by forming a statistical average of all single solution positions derived from the set of quadratic equations and then combining remaining double root positions of the set of quadratic equations based on minimum distances to a mean position of all positions and providing a signal indicative of the tentative final position of the transmitter.

3. The method of claim 1 which further comprises the step of:

wild point filtering the signal indicative of the tentative final position of the transmitter to eliminate any computed position locations that are physically inconsistent with the last known position of the transmitter.

4. The method of claim 1 wherein the step of processing the at least three time of arrival signals further comprises the step of:

if less than three time-of-arrival values are received in the position data set, the step of computing the relative position of the transmitter is aborted and an identifying code is provided.

5. The method of claim 1 wherein the step of processing the computed position signal using the clustering process comprises the step of updating the mean position as each double root position is processed.

6. A method for use in a vehicle location system employing hyperbolic ranging, the vehicle location system comprising a mobile transmitter and at least three time-synchronized receivers, and wherein the transmitter is adapted to transmit a vehicle location signal that is received by the receivers and wherein the receivers are each adapted to transmit time of arrival signals to a central processing station for processing, said method comprising the steps of:

receiving at least three time of arrival signals from the receivers which comprises a position data set of all time-of-arrival values received for the transmitter during a given transmission;

processing the at least three time of arrival signals to produce a geometric dilution of precision (GDOP) table at periodic intervals whose values are representative of the geometrical relation between the receivers and the transmitter;

if at least three time of arrival signals are received, prefiltering the at least three time of arrival signals using a prefilter to remove any signals that are corrupted by anomalies in the propagation of the transmitted signal, thereby determining an optimum subset of data for further processing;

computing the relative position of the transmitter by solving a predetermined set of quadratic equations using the differential times-of-arrival values of the time of arrival signals received by the receivers to provide a computed position signal; and cluster filtering the computed position signal using a clustering process by forming a statistical average of all single solution positions derived from the set of quadratic equations and then combining remaining double root positions of the set of quadratic equations based on minimum distances to a mean position of all positions and providing a signal indicative of the tentative final position of the transmitter.

7. The method of claim 6 which further comprises the step of:

wild point filtering the signal indicative of the tentative final position of the transmitter to eliminate any computed position locations that are physically inconsistent with the last known position of the transmitter.

8. The method of claim 6 wherein the step of processing the at least three time of arrival signals further comprises the step of:

if less than three time-of-arrival values are received in the position data set, the step of computing the relative position of the transmitter is aborted and an identifying code is provided.

9. The method of claim 6 wherein the step of processing the computed position signal using the clustering process comprises the step of updating the mean position as each double root position is processed.

10. A method for use in a vehicle location system employing hyperbolic ranging, the vehicle location system comprising a mobile transmitter and at least three time-synchronized receivers, and wherein the transmitter is adapted to transmit a vehicle location signal that is received by the receivers and wherein the receivers are each adapted to transmit time of arrival signals to a central processing station for processing, said method comprising the steps of:

receiving at least three time of arrival signals from the receivers which comprises a position data set of all time-of-arrival values received for the transmitter during a given transmission;

processing the at least three time of arrival signals to produce a geometric dilution of precision (GDOP) table at periodic intervals whose values are representative of the geometrical relation between the receivers and the transmitter;

if at least three time of arrival signals are received, prefiltering the at least three time of arrival signals using a prefilter to remove any signals that are corrupted by anomalies in the propagation of the transmitted signal, thereby determining an optimum subset of data for further processing;

computing the relative position of the transmitter by solving a predetermined set of quadratic equations using the differential times-of-arrival values of the time of arrival signals received by the receivers to provide a computed position signal;

cluster filtering the computed position signal using a clustering process by forming a statistical average of all single solution positions derived from the set of quadratic equations and then combining remaining double root positions of the set of quadratic equations based on minimum distances to a mean position of all positions and providing a signal indicative of the tentative final position of the transmitter; and wild point filtering the signal indicative of the tentative final position of the transmitter to eliminate any computed position locations that are physically inconsistent with the last known position of the transmitter.

11. The method of claim 10 wherein the step of processing the at least three time of arrival signals further comprises the step of:

if less than three time-of-arrival values are received in the position data set, the step of computing the relative position of the transmitter is aborted and an identifying code is provided.

12. The method of claim 10 wherein the step of processing the computed position signal using the clustering process comprises the step of updating the mean position as each double root position is processed.

* * * * *